United States Patent
Sartori et al.

(10) Patent No.: US 7,706,330 B2
(45) Date of Patent: Apr. 27, 2010

(54) METHOD AND SYSTEM FOR LINK ADAPTATION IN A WIRELESS MULTI-CARRIER COMMUNICATION SYSTEM

(75) Inventors: Philippe J. Sartori, Algonquin, IL (US); Yufei W. Blankenship, Streamwood, IL (US); Brian K. Classon, Palatine, IL (US); Sebastien Simoens, Sceaux, Hauts de Seine (FR)

(73) Assignee: Motorola, Inc., Schaumburg, IL (US)

( * ) Notice: Subject to any disclaimer, the term of this patent is extended or adjusted under 35 U.S.C. 154(b) by 476 days.

(21) Appl. No.: 11/242,456

(22) Filed: Oct. 3, 2005

(65) Prior Publication Data

US 2007/0077952 A1 Apr. 5, 2007

(51) Int. Cl.
*H04Q 7/00* (2006.01)
(52) U.S. Cl. ............... 370/333; 370/338; 455/515
(58) Field of Classification Search ......... 370/328–333, 370/338; 455/450, 452.1, 452.2, 461, 515
See application file for complete search history.

(56) References Cited

U.S. PATENT DOCUMENTS

| | | | |
|---|---|---|---|
| 6,002,670 A * | 12/1999 | Rahman et al. | 370/238 |
| 6,374,117 B1 * | 4/2002 | Denkert et al. | 455/522 |
| 6,732,323 B1 * | 5/2004 | Mitlin et al. | 714/784 |
| 7,424,273 B2 * | 9/2008 | Alexiou | 455/101 |
| 2002/0067703 A1 * | 6/2002 | Fernandez Duran et al. | 370/328 |
| 2004/0116140 A1 * | 6/2004 | Babbar et al. | 455/517 |
| 2004/0192322 A1 * | 9/2004 | Dacosta et al. | 455/452.1 |
| 2005/0068916 A1 * | 3/2005 | Jacobsen et al. | 370/328 |
| 2006/0008020 A1 * | 1/2006 | Blankenship et al. | 375/261 |
| 2006/0183429 A1 * | 8/2006 | Anderson | 455/67.13 |
| 2008/0095222 A1 * | 4/2008 | VanLaningham et al. | 375/227 |

FOREIGN PATENT DOCUMENTS

WO 2007-040906 A2 4/2007

OTHER PUBLICATIONS

Nhan Le, "PCT/US2006/034950—PCT International Search Report and Written Opinion," WIPO, ISA/US, Commissioner for Patents, Alexandria, VA, USA, Feb. 27, 2008, 10 pages, most relevant pp. 3, 6-9.

Yoshiko Kuwahara, "PCT/US2006/034950—PCT International Preliminary Report of Patentability," The International Bureau of WIPO, Geneva, Switzerland, Mar. 26, 2009, 8 pages, most relevant pp. 1, 5-8.

Korean Examiner, "KIPO's Notice of Preliminary Rejection," Korean Intellectual Property Office, Daejeon, Republic of Korea, Oct. 30, 2009, 4 pages, most relevant pp. 1.

* cited by examiner

*Primary Examiner*—Nhan Le

(57) ABSTRACT

A method and system for link adaptation between a wireless multi-carrier access point (102) and a wireless multi-carrier communication device (104) is described. The wireless multi-carrier access point obtains a set of available LEP methods from the wireless multi-carrier communication device. The wireless multi-carrier access point selects an LEP method from the set of available LEP methods, based on at least one link parameter. The wireless multi-carrier access point then communicates the LEP method selected, to the wireless multi-carrier communication device. The selected LEP method is used during the transmission of information between the wireless multi-carrier access point and the wireless multi-carrier communication device.

29 Claims, 8 Drawing Sheets

| ANTENNA TECHNIQUE | MODULATION TECHNIQUE | CODING RATE | WIRELESS MULTI-CARRIER COMMUNICATION DEVICE (104) | WIRELESS MULTI-CARRIER COMMUNICATION DEVICE (106) | WIRELESS MULTI-CARRIER COMMUNICATION DEVICE (108) |
|---|---|---|---|---|---|
| SDM 2X2 | 64 - QAM | ½ | EESM | Capacity | SNR |
| SDM 2X2 | 64 - QAM | ¼ | EESM | adv – ESM | SNR |
| SDM 2X2 | 64 - QAM | ¾ | EESM | adv – ESM | CAPACITY |
| SDM 2X2 | 64 - QAM | 5/6 | EESM | EESM | CAPACITY |

FIG. 3

| Field | Number of bits |
|---|---|
| Number of scalars N | 4 bits |
| scalar 1 | 8 bits |
| scalar 2 | 8 bits |
| ...... | 8 bits |
| scalar N | 8 bits |
| Number of point M | 4 bits |
| X1 | 8 bits |
| Y1 | 8 bits |
| ... | 8 bits |
| XM | 8 bits |
| YM | 8 bits |

FIG. 7

| Field | Number of bits |
|---|---|
| Number of returned values N | 3 bits |
| Mode #1 | 5 bits |
| Stream 1 | 8 bits |
| ……. | 8 bits |
| Stream M | 8 bits |
| … | 8 bits |
| Mode #N | 5 bits |
| Stream 1 | 8 bits |
| … | 8 bits |
| Stream M | 8 bits |

FIG. 8

METHOD AND SYSTEM FOR LINK ADAPTATION IN A WIRELESS MULTI-CARRIER COMMUNICATION SYSTEM

FIELD OF THE INVENTION

The present invention relates generally to the field of wireless multi-carrier communication systems and more specifically, to a method for link adaptation in a wireless multi-carrier communication network.

BACKGROUND OF THE INVENTION

A wireless multi-carrier communication system includes at least one wireless multi-carrier access point and a plurality of wireless multi-carrier communication devices. Advanced wireless multi-carrier communication systems such as the IEEE 802.16e system utilize Adaptive Modulation and Coding (AMC) to improve system performance. With AMC, the modulation and coding scheme (MCS) of a transmitted data stream for a particular receiver is changed to predominantly match a current received signal quality (at the receiver) for the particular frame being transmitted. The modulation and coding scheme may change on a frame-by-frame basis in order to track the channel quality variations that occur in mobile communication systems.

The performance of any system employing AMC is highly dependent upon the accuracy in determining a receiver's channel quality, and in particular the accuracy of the underlying link error probability prediction. Link error probability prediction (LEP) maps the current radio conditions (channel quality) to an expected link performance metric, such as Frame Error Rate (FER). Bad link prediction severely degrades the performance of AMC. In order to achieve high system throughput, a simple link error probability predictor that accurately models coded orthogonal frequency division multiplexing (OFDM) performance or any other multi-carrier modulation is therefore critical for any multicarrier system employing AMC.

Several LEP methods are available, such as the Exponential Effective SIR Mapping method (exp-ESM). Another known method proposes that a wireless multi-carrier communication device advertises a preferred modulation and coding scheme (MCS), and that transmission of data takes place, based on the advertised MCS. The advertised MCS method is considered as an LEP method since advertising an MCS is one way of signaling the link quality. LEPs can vastly differ in terms of performance, complexity, or range of applicability. A simple LEP method may do very well for single antenna transmission case and low coding rate, but may have a severely degraded performance for multiple antenna transmissions where a more complex method could perform very well. Also, LEP methods require a different amount of feedback, for example, SNR based LEP requires very little feedback whereas more advanced LEP methods require more feedback. Depending on the system configuration, the wireless multi-carrier system may or may not tolerate a large amount of feedback.

Known methods for link adaptation do not define a detailed procedure for selecting an LEP method. Moreover, the link adaptation methods are generally designed for one specific LEP method, and are therefore not capable of handling various LEP methods, as conditions change. Therefore, a need exists for a method and system for link adaptation in a wireless multi-carrier system capable of dynamically changing the underlying LEP method, upon which the AMC algorithm relies.

BRIEF DESCRIPTION OF DRAWINGS

The present invention is illustrated by way of example and not limitation in the accompanying figures, in which like references indicate similar elements, and in which:

FIG. 3 representatively illustrates an example of LEP mode mapping 218, in accordance with some embodiments of the invention.

FIG. 7 representatively illustrates an example of a table mapping different calibration parameters to the corresponding number of bits for executing the calibration phase, in accordance with some embodiments of the invention.

FIG. 8 representatively illustrates a table depicting a format for an explicit signaling message for the explicit signaling phase.

Figure 1:
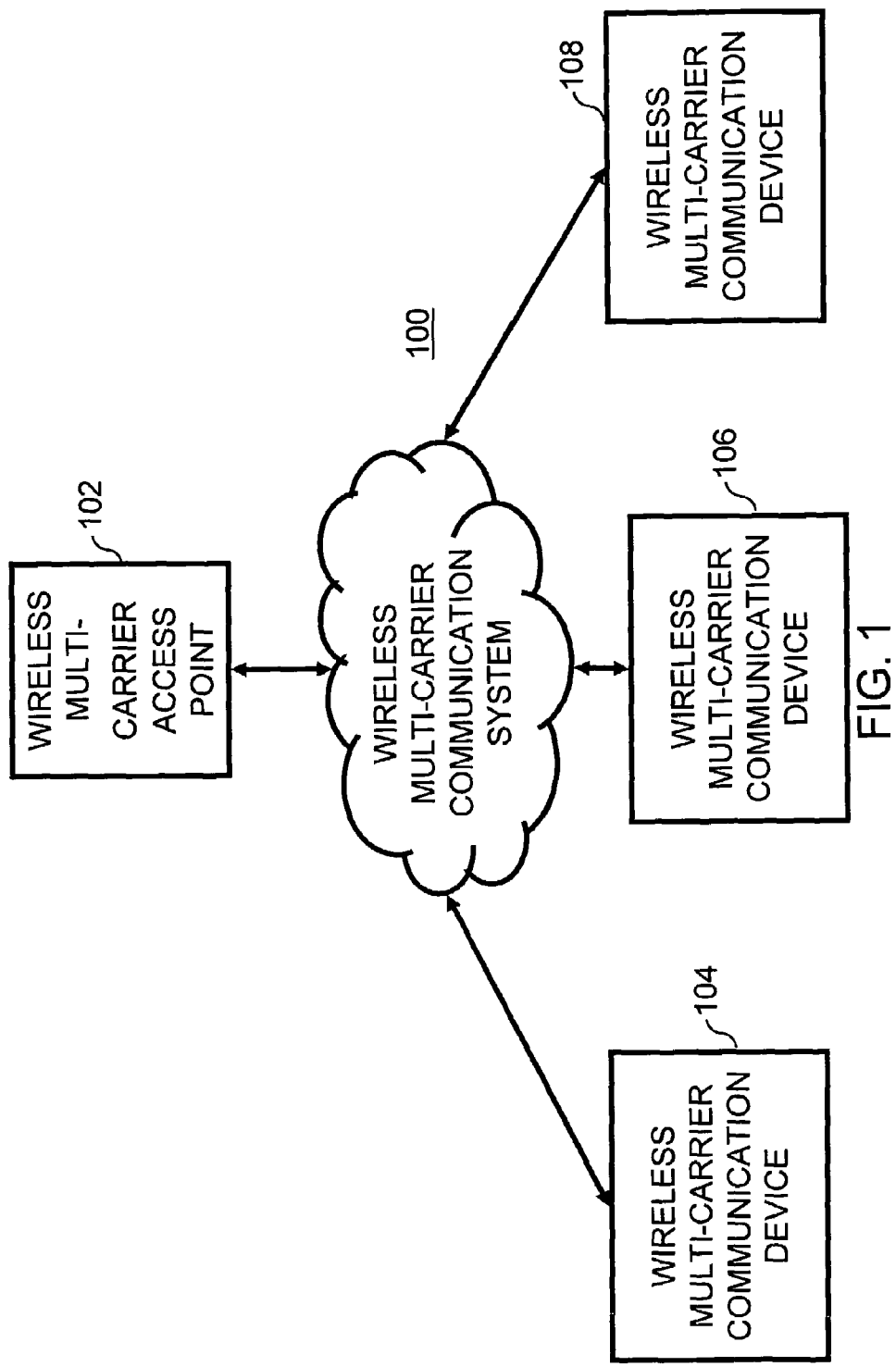
FIG. 1 representatively illustrates a block diagram of a wireless multi-carrier communication system including a wireless multi-carrier access point and a plurality of wireless multi-carrier communication devices, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF DRAWINGS

Before describing in detail the particular method and system for link adaptation in a wireless multi-carrier communication system in accordance with the present invention, it should be observed that the present invention resides primarily in combinations of method steps and apparatus components related to method and system for link adaptation in a multi-carrier system. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

A "set" as used in this document, means a non-empty set (i.e., comprising at least one member). The term "another", as used herein, is defined as at least a second or more. The term "including" as used herein, is defined as comprising.

In accordance with the present invention, a method for link adaptation in a wireless multi-carrier communication system is provided. The wireless multi-carrier communication system includes a plurality of wireless multi-carrier communication devices and at least one wireless multi-carrier access point. The wireless multi-carrier access point explicitly or implicitly obtains a set of available LEP methods from the wireless multi-carrier communication device. The wireless multi-carrier access point selects an LEP method from the set of available LEP methods, based on at least one link parameter. The selected LEP method is communicated to the wireless multi-carrier communication device by the wireless multi-carrier access point and is used during the transmission of data between the wireless multi-carrier communication device and the wireless multi-carrier access point.

FIG. 1 representatively illustrates a block diagram of a wireless multi-carrier communication system including a wireless multi-carrier access point and a plurality of wireless multi-carrier communication devices, in accordance with some embodiments of the present invention. FIG. 1 illustrates a wireless multi-carrier communication system 100, a wireless multi-carrier access point 102, and a plurality of wireless multi-carrier communication devices, for example, wireless multi-carrier communication devices 104, 106 and 108. Examples of a wireless multi-carrier communication device include, but are not limited to, computational devices, personal computers, mobile phones, laptops, MP3 players, personal digital assistants (PDAs), and so forth.

Information is transmitted between the wireless multi-carrier communication devices and the wireless multi-carrier access point 102 over one or more communication channels, with the information being grouped into frames or multiple frame segments that are transmitted in a time slot. The quality of the information signal received by the wireless multi-carrier communication devices depends on many factors. Exemplary factors include the distance of the wireless multi-carrier communication devices from the wireless multi-carrier access point 102, the path loss attenuation, shadowing, fast fading conditions and level of interference. To improve the quality of the information signal, the information signal to be transmitted to the wireless multi-carrier communication devices can be modified in order to compensate for quality variations in the information signal. This process is known as link adaptation. Link performance can be characterized by a frame error rate (FER) and depends amongst other factors on the selected modulation scheme, the selected forward error correction (FEC) code, the selected transmission scheme, and the characteristics of the channel. The link performance can be evaluated by different link error prediction (LEP) methods. Examples of LEP methods include, but are not limited to, exponential Effective SIR Mapping (referred to as exp-ESM or EESM), advanced Effective SIR Mapping (referred to as adv-ESM), Mutual Information Effective SIR Mapping (referred to as MI-ESM), capacity-based LEP, advertised Modulation and Coding Scheme (MCS) LEP, SNR-based LEP, average SNR-based LEP, Equivalent SNR Method based on Convex Metric-based LEP (referred to as ECM) and a quasi-static method based on the computational power of the wireless multi-carrier communication devices.

LEP methods may vary in their complexities, their requirement of processing power capabilities and their requirement of feedback information. Some LEP methods are accurate for all the channels but require a considerable amount of processing power of a wireless multi-carrier communication device. An example of such an LEP method is the exp-ESM method. However, a wireless multi-carrier communication device can compromise on accuracy by using a less complex LEP method, in order to save processing power. This is especially appropriate when the wireless multi-carrier communication device moves at a moderate to high speed, since the exp-ESM information may become obsolete before the actual data transmission. In such a case, average-SNR based LEP might provide satisfactory link error prediction. More accurate LEP (e.g., EESM) may require more feedback than less accurate LEP methods (for example, average-SNR based). Therefore, if capacity for feedback is limited, the less accurate LEP method may be preferred. Accordingly, the choice of an LEP method for the transmission of information in the one or more communication channels depends on the capabilities of the wireless multi-carrier communication devices and the characteristics or link parameter of the one or more communication channels.

Examples of link parameters include, but are not limited to, modulation technique, coding rate, channel coding type, quality of service (QoS), coherence time, user speed, Doppler frequency, bandwidth, carrier frequency and antenna technique.

For instance, consider that the wireless multi-carrier communication device 104 is a high-computational power unit, for example, a high-end laptop. Further, consider that the wireless multi-carrier communication device 106 is a CPU-limited computational device, for example, a PDA. The wireless multi-carrier communication device 108 is considered to be a severely CPU-limited computational device, for example, an MP3 player. The wireless multi-carrier communication device 104 can use any LEP method from a group of LEP methods including, but not limited to, exp-ESM, adv-ESM, MI-ESM, capacity-based LEP, SNR-based LEP, average SNR-based LEP, ECM-based LEP and a quasi-static method based on the high computational power of the wireless multi-carrier communication device 104. The wireless multi-carrier communication device 106 is a CPU-limited device and can therefore only use a less complex LEP method. Examples of LEP methods that can be used by the wireless multi-carrier communication device 106 are therefore restricted to adv-ESM, capacity-based LEP and SNR-based LEP. The wireless multi-carrier communication device 108 is a severely CPU-limited computational device and can therefore use only capacity-based LEP and SNR-based LEP. It should be appreciated that the LEP methods listed above for the wireless multi-carrier communication devices are exemplary and can vary depending on the processing powers of wireless multi-carrier communication devices. For example, wireless multi-carrier communication device 106 may be capable of using physical CINR (generated by average SNR-based LEP) and effective CINR (generated by exp-ESM, adv-ESM, or MI-ESM based LEP), where CINR is carrier-to-interference-plus-noise-ratio.

In accordance with an embodiment of the present invention, link adaptation primarily involves three phases, namely the handshaking phase, the calibration phase and the explicit signaling phase. For the purpose of this description, these phases are described below with respect to the wireless multi-carrier access point 102 and the wireless multi-carrier communication device 104. In the handshaking phase, the wireless multi-carrier communication device 104 and the wireless multi-carrier access point 102 decide on which LEP method is to be used during the transmission of information between the wireless multi-carrier access point 102 and the wireless multi-carrier communication device 104. In an embodiment of the invention, the wireless multi-carrier point could know the wireless multi-carrier communication devices from a previous network registration. In another embodiment of the invention, the capabilities of the wireless communication device could be specified in a standard such as, the IEEE 802.16e standard and only the LEP method selection is needed. In the calibration phase, calibration parameters for using the LEP method, decided on during the handshaking phase, are exchanged between the wireless multi-carrier communication device 104 and the wireless multi-carrier access point 102. Similar to the handshaking phase, the calibration phase can be optional as well. The explicit signaling phases comprises the wireless multi-carrier communication device 104 and the wireless multi-carrier access point 102 exchanging messages to determine which LEP method to use and, once an LEP method has been selected or changed, the relevant parameters needed for selecting the Modulation and Coding Scheme (MCS) using the selected LEP method. Each of the above-mentioned phases includes further steps, which are performed to implement link adaptation in the wireless multi-carrier communication system 100.

Figure 2:
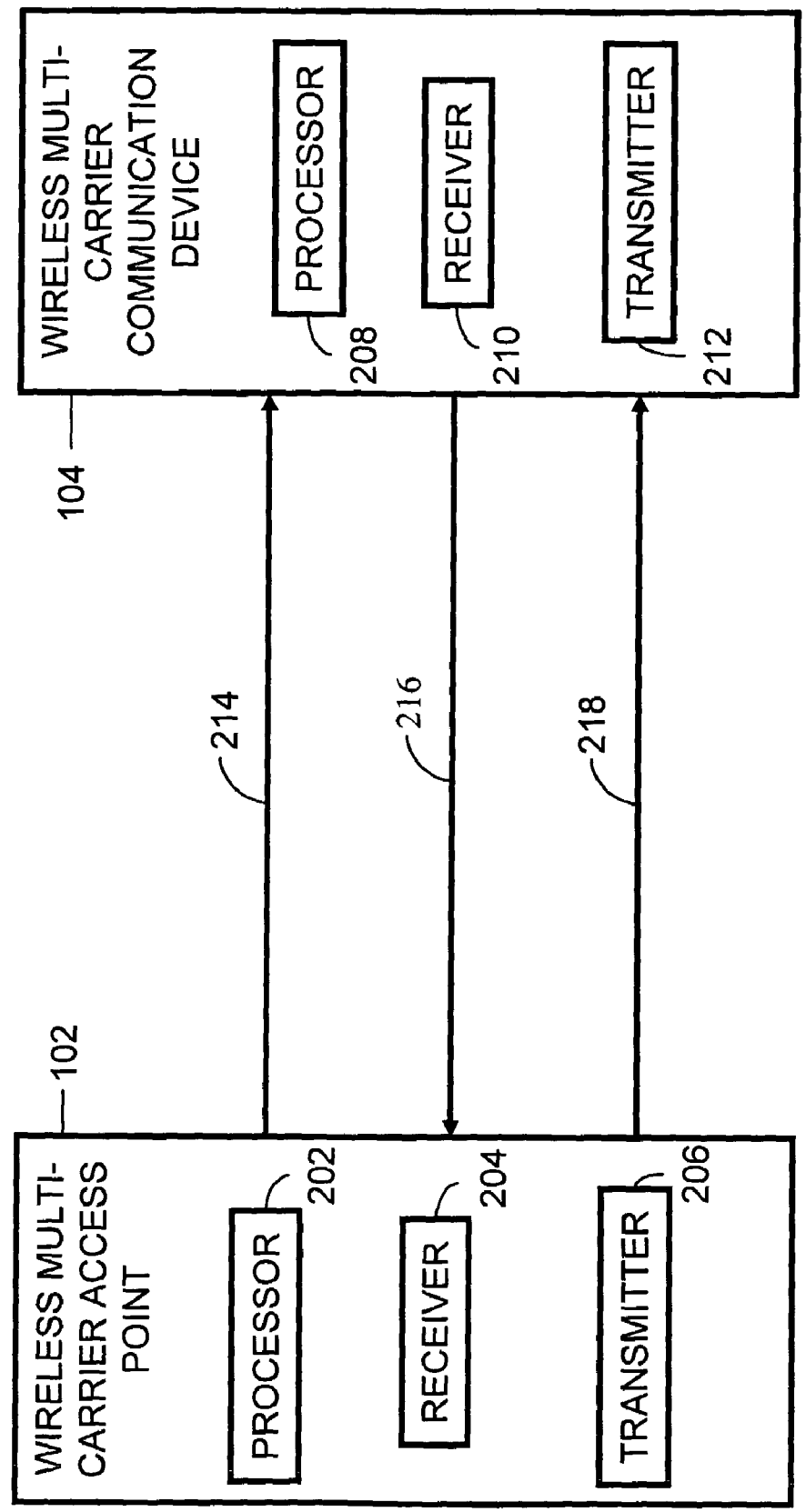
FIG. 2 representatively illustrates a block diagram of the interaction between the wireless multi-carrier access point and the wireless multi-carrier communication device, in accordance with some embodiments of the invention.

FIG. 2 representatively illustrates a block diagram of the interaction between the wireless multi-carrier access point and the wireless multi-carrier communication device, in accordance with some embodiments of the invention. FIG. 2 represents a signal flow diagram of the handshaking phase of the link adaptation method between the wireless multi-carrier access point 102 and the wireless multi-carrier communication device 104. The wireless multi-carrier access point 102 sends an LEP method capability request 214 to the wireless multi-carrier communication device 104. The LEP method capability request is a message to prompt the device to send the list of LEP(s) it is capable of handling. In an embodiment of the invention, the LEP method capability request may be sent by the transmitter 206 at the wireless multi-carrier access point 102. The LEP method capability request 214 may also include an LEP preference request of the wireless multi-carrier communication device 104. In response to the LEP method capability request 214, the wireless multi-carrier communication device 104 sends back an LEP method capability response 216 to the wireless multi-carrier access point 102. In an embodiment of the invention, the LEP method capability response may be sent by a transmitter 212 at the wireless multi-carrier communication device 104. The LEP method capability response 216 from the wireless multi-carrier communication device 104 is a set of LEP methods that the wireless multi-carrier communication device 104 can use to evaluate link quality. The LEP capability response 216 from the wireless multi-carrier communication device 104 may also include the link parameters associated with the set of LEP methods that is sent to the wireless multi-carrier access point 102. The link parameters in the LEP method capability response can also include parameters related to one or more communication channels. The LEP method capability response 216 from the wireless multi-carrier communication device also includes an indicator of whether the wireless multi-carrier communication device 104 can send a time-stamped modulation and coding scheme (MCS). In that case, the channel quality metrics that will be used will be the best sustainable MCS. The LEP method capability response 216 from the wireless multi-carrier communication device 104 may also include sending class values which indicate the processing power capability and LEP method preference of the wireless multi-carrier communication device 104. In an embodiment of the present invention, the LEP capability response 216 may be received at the wireless multi-carrier access point 102 by a receiver 204. After receiving the LEP method capability response 216 from the wireless multi-carrier communication device 104, the wireless multi-carrier access point 102 generates an LEP mode-mapping 218, based on the LEP method preference and capabilities sent by the wireless multi-carrier communication device 104. The LEP mode mapping 218 is a mapping of the LEP methods to the link parameters, both of which are sent by the wireless multi-carrier communication device 104. In an embodiment of the present invention, the LEP mode mapping 218 may be generated by a processor 202 at the wireless multi-carrier access point 102. The LEP mode mapping 218 is communicated to the wireless multi-carrier communication device 104 by the wireless multi-carrier access point 102. In an embodiment of the present invention, the LEP mode mapping may be received by a receiver 210 at the wireless multi-carrier communication device 104. The wireless multi-carrier communication device 104 uses the LEP mode-mapping 218 to transmit information signals from the wireless multi-carrier access point 102 to the wireless multi-carrier communication device 104. In an embodiment of the present invention, the LEP mode mapping may be used by a processor 208 at the wireless multi-carrier communication device 104, to transmit information from the wireless multi-carrier access point 102 to the wireless multi-carrier communication device 104. The handshaking procedure described in FIG. 2 may happen every time a handoff procedure between wireless multi carrier access points and a wireless multi-carrier communication device occurs or once when the wireless multi-carrier communication device initially accesses the network. In an embodiment of the invention, the LEP capabilities might be hard coded in both the wireless multi-carrier access point and the wireless multi-carrier communication device such that the handshaking procedure described in FIG. 2 is not needed. For example, in a system where both the wireless multi-carrier access point and the wireless multi-carrier communication device know that they can use both physical CINR metric (generated by average SNR-based LEP) and effective CINR (generated by exp-ESM, adv-ESM, or MI-ESM based LEP).

FIG. 3 representatively illustrates an example of LEP mode mapping 218, in accordance with some embodiments of the invention. The mapping as shown in FIG. 3 is created at the wireless multi-carrier access point 102 after the wireless multi-carrier access point 102 receives the LEP method capability response and LEP preference of the wireless multi-carrier communication device 104. The mapping in FIG. 3 shows the preferences and/or capabilities of the wireless multi-carrier communication devices 104, 106 and 108 depending on the link parameters. As shown in FIG. 3, the wireless multi-carrier communication device 104 has the highest processing power capability, and can use advanced LEP methods, for example, exp-ESM, for all values of link parameters. The wireless multi-carrier communication device 106 has average processing capabilities and therefore, selects LEP methods depending on the link parameters. For example, the wireless multi-carrier communication device 106 uses capacity based LEP (less complex), when the coding rate is less and uses adv-ESM (more complex), when the coding rate is higher. The wireless multi-carrier communication device 108 is severely CPU limited, and hence uses less complex LEP methods, for example, capacity based LEP and SNR based LEP. In some embodiments of the invention, even if the wireless multi-carrier communication device is capable of using advanced LEP methods, it can still choose to use simple LEP methods. For example, there is no significant advantage in using exp-ESM based LEP over average SNR based LEP in a high Doppler environment.

Figure 4:
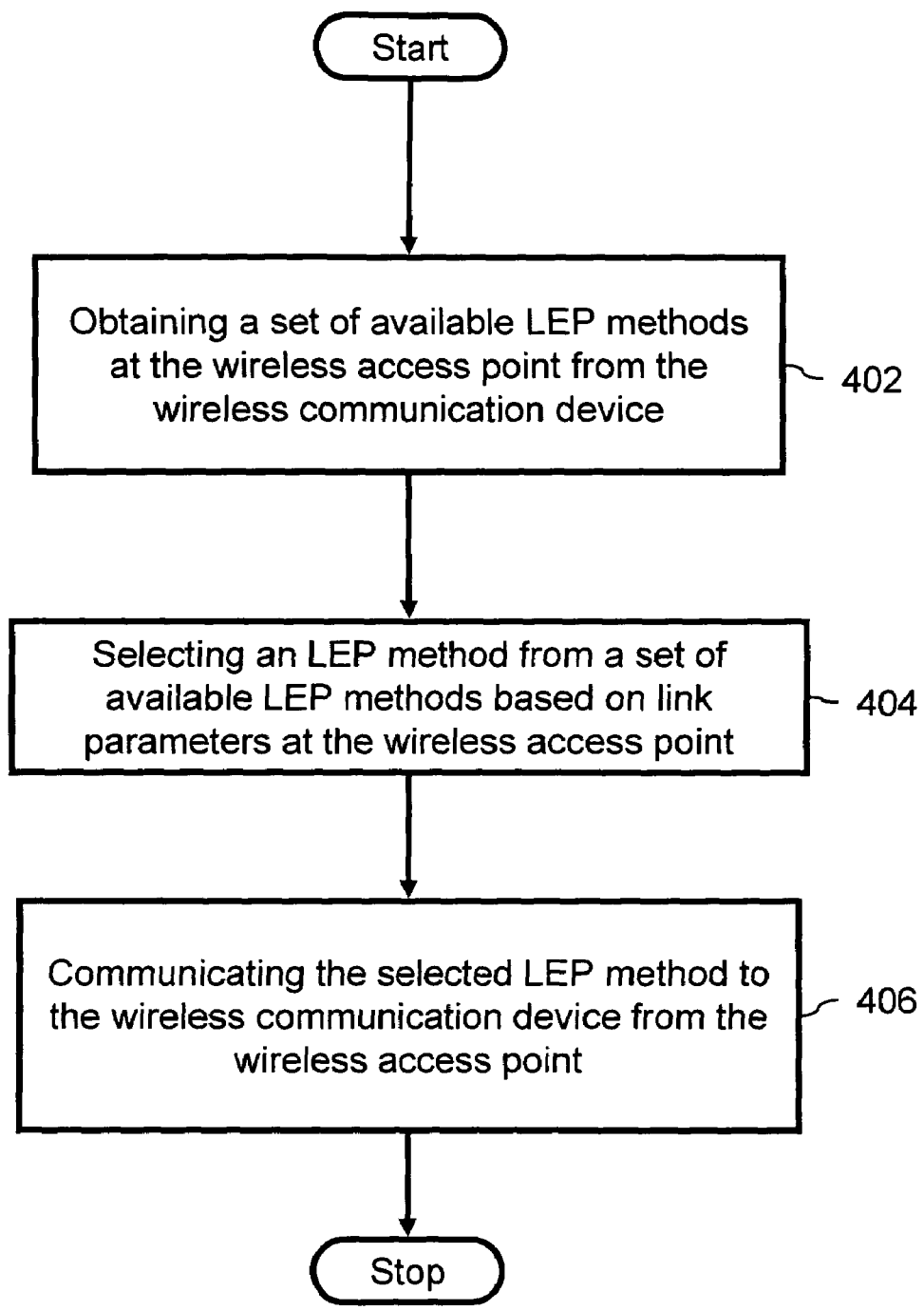
FIG. 4 representatively illustrates a flowchart depicting a method for link adaptation in a wireless multi-carrier communication system at a wireless multi-carrier access point, in accordance with some embodiments of the invention.

FIG. 4 representatively illustrates a flowchart depicting a method for link adaptation in a wireless multi-carrier communication system at a wireless multi-carrier access point, in accordance with some embodiments of the invention. At step 402, a wireless multi-carrier access point gets an LEP capability message from a wireless multi-carrier communication device. The LEP capability message indicates a set of available LEP methods that the wireless multi-carrier communication device can use and link parameters. The LEP capability message, sent to the wireless multi-carrier access point at step 402, may include a flag indicating whether the wireless multi-carrier communication device is able to send a time-stamped MCS. The LEP method capability message sent to the wireless multi-carrier access point at step 402, may also include a class value indicating the processing power capabilities and preferences of the wireless multi-carrier communication device. An LEP capability message may contain a class value, with the class value indicating supported capabilities or options. The plurality of LEP methods may be signaled with a bit field indicating supported and/or preferred options. Alternatively, an LEP method may be a default for a class value. In addition to processing power capabilities, class values may be associated with supportable data rate, form factor (laptop, PDA, cell phone, etc.) or the like. At step 404, the wireless multi-carrier access point selects an LEP method from the set of available LEP methods received at step 402. The wireless multi-carrier access point may use the preferences of the wireless multi-carrier communication device or may ignore them. For example, the wireless multi-carrier access point can decide to use average SNR-based LEP in order to reduce feedback overhead and conserve bandwidth. In an embodiment of the present invention, a rule-based system is used to select the LEP method from the set of available LEP methods based on the link parameters. For example, one LEP method may be used unless the bandwidth link parameter is greater than or equal to 10 MHz. A table may be used as an alternative to, in conjunction with, or as an instantiation of a rule-based system. FIG. 3 is a table-based implementation of a rule-based system for LEP selection. The wireless multi-carrier access point maps different link parameters to the set of available LEP methods that have been received from the wireless multi-carrier communication device. At step 406, the selected LEP method is communicated to the wireless multi-carrier communication device from the wireless multi-carrier access point. The wireless multi-carrier access point then starts using the LEP method that is selected from a set of available LEP methods at the next frame when transmission of information signals to the wireless multi-carrier communication device occurs.

Figure 5:
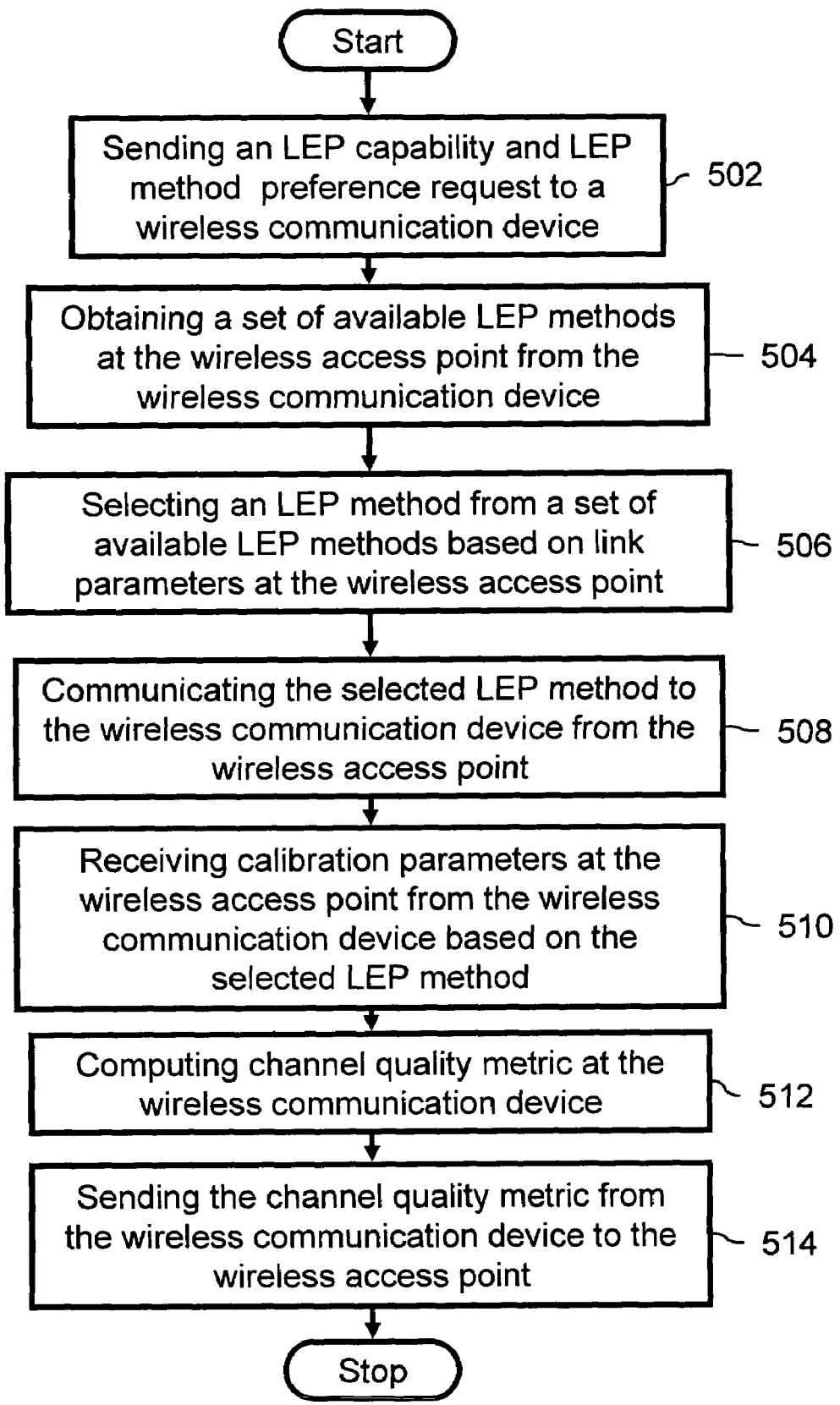
FIG. 5 representatively illustrates a flowchart depicting a method for link adaptation in a wireless multi-carrier communication system at the wireless multi-carrier device, in accordance with another embodiment of the invention.

FIG. 5 representatively illustrates a flowchart depicting a method for link adaptation in a wireless multi-carrier communication system at the wireless multi-carrier device, in accordance with another embodiment of the invention. At step 502, a wireless multi-carrier access point sends an LEP method capability and LEP preference request to at least one wireless multi-carrier communication device in the wireless multi-carrier communication system. In response to the LEP method capability request and LEP preference request from the wireless multi-carrier access point, the at least one wireless multi-carrier communication device sends a set of available LEP methods to the wireless multi-carrier access point, at step 504. The LEP capability response sent to the wireless multi-carrier access point at step 504 can include a flag indicating whether the multi-carrier communication devices are able to send time-stamped MCSs. The LEP method capability response sent to the wireless multi-carrier access point at step 504 may also include a class value indicating the processing power capabilities and preferences of the wireless multi-carrier communication devices. The class value may also indicate all LEP capabilities/preferences. At step 506, the wireless multi-carrier access point selects an LEP method from the set of available LEP methods received at step 504. In an embodiment of the present invention, a rule-based system is used to select the LEP method from the set of available LEP methods based on the link parameters. The wireless multi-carrier access point maps different link parameters to the set of available LEP methods that have been received from the at least one wireless multi-carrier communication device. At step 508, the map is communicated to the at least one wireless multi-carrier communication device from the wireless multi-carrier access point. After each of the at least one wireless multi-carrier communication device and the wireless multi-carrier access point agree on the LEP methods to be used, each of the at least one wireless multi-carrier communication device sends calibration parameters needed for performing error prediction for the selected LEP method(s), at step 510. These calibration parameters are described later in conjunction with FIG. 7.

At step 512, each of the wireless multi-carrier communication device computes a channel quality metric. The channel-quality metric comprises channel quality information pertaining to the channel between the wireless multi-carrier access point and the wireless multi-carrier communication devices. Channel quality metrics are described later in conjunction with FIG. 8. At step 514, the channel-quality metric that is computed at the wireless multi-carrier communication device is transmitted to the wireless multi-carrier access point 102. The channel quality metric may comprise several parameters that may change more or less rapidly. Therefore, the wireless multi-carrier communication device may report only the parameters of the channel quality metric that have substantially changed from the last channel quality metric report to the wireless multi-carrier access point. The wireless multi-carrier access point receives the channel-quality metric and determines a modulation type, a coding rate and a coding type to be used by the wireless multi-carrier communication device at least partly based on the selected LEP method and the channel quality metric.

In an embodiment of the invention, steps 502 to 510 may be performed before initiating any data transmission and steps 512 and 514 may occur during data transmissions. In another embodiment of the invention steps 502 to 510 may occur while setting up the call and while steps 512 and 514 may occur during a call. The wireless multi-carrier access point 102 then sends to the wireless multi-carrier device which modulation type, coding rate to use. The modulation type and coding rate may be sent in a control message, and may be determined from other parameters such as information block size and payload size. For example, if an information block size of 1000 bits and a payload of 1000 modulation symbols are indicated, the modulation may be QPSK and the code rate may be ½. The wireless multi-carrier communication device transmits information to the wireless access point using the modulation type, the coding rate and the coding type sent by the wireless access point. In an embodiment of the invention, the wireless multi-carrier device may decide the MCS to use and send the indictor of the selected MCS as the channel quality metric.

Figure 6:
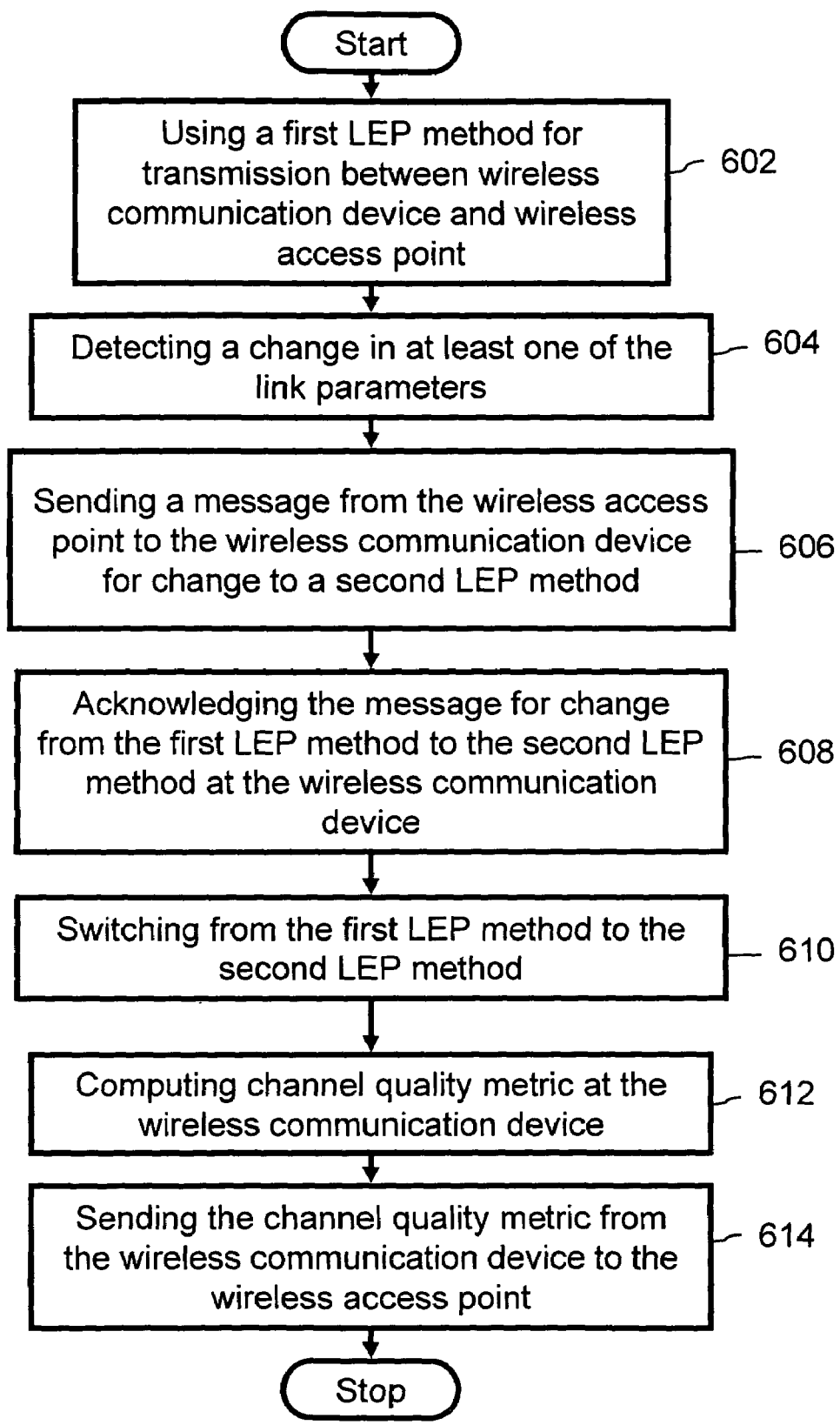
FIG. 6 representatively illustrates a flowchart depicting a method for switching from a first LEP method to a second LEP method from a set of available LEP methods in a wireless multi-carrier communication system, in accordance with some embodiments of the invention.

FIG. 6 representatively illustrates a flowchart depicting a method for switching from a first LEP method to a second LEP method from a set of available LEP methods in a wireless multi-carrier communication system, in accordance with some embodiments of the invention. At step 602, the wireless multi-carrier communication device is using a first LEP method for transmission of information between the wireless multi-carrier communication device and the wireless multi-carrier access point. At step 604, a change is detected in at least one of the link parameters. For example, consider that a wireless multi-carrier communication device is using a capacity based LEP method during the transmission of information between the wireless multi-carrier communication device and the wireless multi-carrier access point. Further, consider that the coding rate is one-fourth of a base coding rate, the modulation technique is 64-QAM and the antenna technique is SDM 2×2. If the coding rate changes from one-fourth to half (in other words coding rate increases), then the wireless multi-carrier access point sends a message to the wireless multi-carrier communication device informing about a change in the link parameter and requesting for changing to a second LEP method, for example to adv-ESM, at step 606. This change of LEP method is defined in a mapping between LEP methods and link parameters stored at the wireless multi-carrier access point. An exemplary mapping was described in conjunction with FIG. 3. In an embodiment of the invention, the wireless multi-carrier access point may provide a time indication in advance, to the wireless multi-carrier communication device for switching from a first LEP method to a second LEP method. The time to switch from the first LEP method to the second LEP method after a predefined number of frames or a predefined amount of time may be known by both the wireless multi-carrier communication device and the wireless multi-carrier access point. At step 608, the wireless multi-carrier communication device acknowledges the request from the wireless multi-carrier access point for changing from the first LEP method to the second LEP method. In an alternate embodiment of the invention, the wireless multi-carrier access point may not acknowledge the request from the wireless multi-carrier communication device and may begin using the second LEP method. At step 610, the wireless multi-carrier communication device switches from the first LEP method to the second LEP method. For example, the wireless multi-carrier access point may switch from capacity based LEP method to adv-ESM due to the change in the link parameter, based on the mapping generated at the wireless multi-carrier access point. In case the wireless multi-carrier communication device does not acknowledge the request for change in LEP, the wireless multi-carrier access point should be able to detect the change in LEP method. The wireless multi-carrier communication device computes channel quality metric for the second LEP method at step 612. At step 614, the wireless communication device sends the channel quality metric for the second LEP method to the wireless multi-carrier access point. The channel-quality metric comprises channel quality information of the channel between the wireless multi-carrier access point and the wireless multi-carrier communication device. The wireless multi-carrier access point receives the channel-quality metric and determines a modulation type, a coding rate and a coding type based on the selected LEP method and the channel quality metric. The wireless multi-carrier access point then transmits information signal based on the modulation type, the coding rate and the coding type.

FIG. 7 representatively illustrates an example of a table mapping different calibration parameters to the corresponding number of bits for executing the calibration phase, in accordance with some embodiments of the invention. The calibration parameters are dependent on the type of LEP method selected and may be specific to link parameters. For example, for the exp-ESM or adv-ESM based LEPs, the calibration parameters may include the FEC type and the effective CINR thresholds for the available MCS. Alternatively, for the exp-ESM or adv-ESM based LEP, the calibration parameters may include some scalar parameters along with a set of FER curves for the AWGN channel. The table shown in FIG. 7 corresponds to adv-ESM with two scalars and their corresponding FER curves. Each FER curve is represented by M points. The coordinates for the M points, ($X_i$, $Y_i$) are also given in the table. The corresponding bit lengths of the curve points and the scalars are provided against each curve point and the scalar. It is necessary to send the FER curves to the wireless multi-carrier access point in order to determine the performance of wireless multi-carrier communication device.

In an embodiment of the invention, the table is constructed by querying the wireless multi-carrier communication device for various link parameters. The wireless multi-carrier access point sends a set of link parameters and an LEP method to be used to the wireless multi-carrier communication device along with a calibration request. In response, the wireless multi-carrier communication device provides calibration parameters for the set of link parameters and the LEP method. The wireless multi-carrier access point then acknowledges the receipt of the calibration parameters. This is repeated for various sets of link parameters and LEP methods. These LEP methods are selected from the set of available LEP methods for the wireless multi-carrier communication device. There may be different ways for the wireless multi-carrier access point to obtain the calibration parameters for various sets of link parameters and LEP methods. For example, instead of sending one request for a single set of calibration parameters, requests for multiple sets of calibration parameters can be bundled together. For example, for the EESM method, the values of the beta parameters and of the SNR thresholds can be sent in a single message for all the possible MCS and antenna techniques.

FIG. 8 representatively illustrates a table depicting a format for an explicit signaling message for the explicit signaling phase. FIG. 8 illustrates a format for an explicit signaling message, such as the explicit signaling message described in step 514 of FIG. 5, in accordance with some embodiments of the invention. After a wireless multi-carrier access point and a wireless multi-carrier communication device agree on the LEP method to be used during the transmission of information between them, and all the calibration parameters needed to perform the LEP method have been selected and communicated, explicit signaling is required during actual transmission of information to send timely link quality information from the wireless multi-carrier communication device to the wireless multi-carrier access point. The link quality information can be the more recent available, from one frame ago, or substantially instantaneous. Explicit signaling can take place in various ways between the wireless multi-carrier access point and the wireless multi-carrier communication device. A first way of signaling is through complete feedback, in which the wireless multi-carrier communication device sends a carrier to interference ratio (C/I) for every sub-carrier and antenna to the wireless multi-carrier access point. In a second way of explicit signaling, the wireless multi-carrier communication device sends one C/I mean value and one C/I variance per frequency bin and per antenna. In a third way of signaling, the wireless multi-carrier communication device computes a channel-quality metric and sends it to the wireless multi-carrier access point. For example, the channel quality metric may be effective CINR, which is measured by the wireless multi-carrier communication device for a predefined MCS at predefined positions. This method of signaling requires minimum feedback from the wireless multi-carrier communication device to the wireless multi-carrier access point. When receiving C/I information the wireless multi-carrier communication device computes a channel-quality metric and then sends the channel-quality metric to the wireless multi-carrier access point. In the example messaging format shown in FIG. 8, channel quality metrics are reported for each data stream. A stream can be defined as one of the existing independent links between a transmitter and a receiver. Each stream can be supported through multiple-input multiple-output (MIMO) communications with multiple transmit and receive antennas. In a multiple antenna system, there are several streams between the transmitter and the receiver. For example, MIMO 2×2 uses 2 streams, and Alamouti encoding uses 1 stream. A mode is a combination of a modulation scheme, a coding rate and a coding type. The message is simple a list of channel quality indicators sent for each mode and for each stream. The message format of FIG. 8 is just one illustrative example out of many possible formats. For example, in another embodiment of the invention, streams and modes could be interchanged. Also, when the antenna technique does not differentiate between streams or codes across all streams, a single value per mode, common for all the streams, could be reported. This format of the message is standardized.

In another embodiment of the present invention, the wireless multi-carrier communication device computes the channel-quality metric comprising channel quality information and then sends it to the wireless multi-carrier access point. The wireless multi-carrier communication device indicates the time validity of the channel-quality metric to the wireless multi-carrier access point. The channel-quality metric time validity may be specified in terms of the number of frames. By sending the channel-quality metric time validity, the wireless multi-carrier communication device provides a preference of an LEP method from a set of available LEP methods for a predefined amount of time. The wireless multi-carrier communication device may specify channel-quality metric time validity in terms of the number of frames, indicating a preference for an LEP method, from a set of available LEP methods for a predefined number of frames. The time validity is an example of a link parameter, as it may be a function of Doppler rate. For example, a time validity of zero (0) may indicate that an average-SNR based LEP should be used, and a large time validity (e.g., 15 frames) may indicate that a different LEP should be used. For example, longer time validity may justify a larger feedback for a more accurate LEP.

The embodiments of the method and system for link adaptation in a wireless multi-carrier communication system described herein offer numerous advantages. Various embodiments of the present invention enable the wireless multi-carrier communication system to select an LEP method based on parameters related to the wireless multi-carrier communication device and the wireless multi-carrier access point. An embodiment of the present invention enables the wireless multi-carrier communication device and the wireless multi-carrier access point to switch from a first LEP method to a second LEP method if any of the link parameters change due to channel variations in the link. Switching from a first LEP method to a second LEP method is based on the mapping generated at the wireless multi-carrier access point. In another embodiment of the present invention, the wireless multi-carrier access point is enabled to decide an LEP method to be used for a predefined amount of time. The predefined amount of time for using the LEP method may be defined in terms of the number of frames. Various embodiments of the present invention enable the wireless multi-carrier communication device and the wireless multi-carrier access point to transmit information more efficiently.

It will be appreciated the method and system for link adaptation in a wireless multi-carrier communication system 100 described herein may comprise one or more conventional processors and unique stored program instructions that control the one or more processors to implement, in conjunction with certain non-processor circuits, some, most, or all of the functions of the link adaptation method in a wireless multi-carrier communication system described herein. The non-processor circuits may include, but are not limited to, a radio receiver, a radio transmitter, signal drivers, clock circuits, power source circuits, and user input devices. As such, these functions may be interpreted as steps of a method to perform transmission of data in a wireless multi-carrier communication system. Alternatively, some or all functions could be implemented by a state machine that has no stored program instructions, or in one or more application specific integrated circuits ASICs, in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for link adaptation in a wireless multi-carrier access point, the method comprising:
   obtaining a set of available link error prediction (LEP) methods, wherein an LEP method is a method used to determine an expected link performance metric based on at least one channel quality metric;
   selecting an LEP method from the set of available LEP methods; and communicating the selected LEP method to a wireless multi-carrier communication device.

2. The method of claim 1, wherein the set of available LEP methods is at least in part obtained from the wireless multi-carrier communication device.

3. The method of claim 1 further comprising selecting and communicating a different LEP method from the set of available LEP methods based on a change in at least one link parameter.

4. The method of claim 1, wherein the set of available LEP methods comprises at least one LEP method selected from a group comprising exponential Effective SIR Mapping (referred to as exp-ESM or EESM), advanced Effective SIR Mapping (referred to as adv-ESM), Mutual Information Effective SIR Mapping (referred to as MI-ESM), capacity-based LEP, advertised Modulation and Coding Scheme (MCS) LEP, SNR-based LEP, average SNR-based LEP, Equivalent SNR Method based on Convex Metric-based LEP (referred to as ECM) and a quasi-static method.

5. The method of claim 1, wherein the LEP method is selected from the set of available LEP methods based on at least one link parameter, and the at least one link parameter is a parameter selected from a group comprising a modulation technique, a coding rate, a coding type, a quality of service (QoS), a coherence time, a user speed, a Doppler frequency, a bandwidth, a carrier frequency and an antenna technique.

6. The method of claim 1 further comprising receiving one or more calibration parameters from the wireless multi-carrier communication device depending on which LEP method from the set of available LEP methods is to be used.

7. The method of claim 6, wherein the calibration parameters are based on at least one of a modulation technique, a coding scheme and an antenna technique.

8. The method of claim 1 further comprising obtaining at least one of a capability and a preference of LEP methods from the wireless multi-carrier communication device.

9. The method of claim 1 further comprises receiving a channel-quality metric from the wireless multi-carrier communication device.

10. The method of claim 9 further comprising:
determining a modulation type and coding rate based on the selected LEP method and the channel quality metric; and
sending data to the wireless multi-carrier communication device.

11. The method of claim 1 further comprising receiving a channel-quality metric time validity.

12. The method of claim 11, wherein the channel-quality metric time validity is specified in number of frames.

13. A method for link adaptation in a wireless multi-carrier communication device, the method comprising:
sending a set of available link error prediction (LEP) methods to a multi-carrier access point, wherein an LEP method is a method used to determine an expected link performance metric based on at least one channel quality metric; and
receiving an LEP method that is selected from the set of available LEP methods from the wireless multi-carrier access point.

14. The method of claim 13, wherein the set of available LEP methods comprises at least one LEP methods selected from a group comprising exponential Effective SIR Mapping (referred to as exp-ESM or EESM), advanced Effective SIR Mapping (referred to as adv-ESM), Mutual Information Effective SIR Mapping (referred to as MI-ESM), capacity-based LEP, advertised Modulation and Coding Scheme (MCS) LEP, SNR-based LEP, average SNR-based LEP, Equivalent SNR Method based on Convex Metric-based LEP (referred to as ECM) and a quasi-static method.

15. The method of claim 13, wherein the LEP method that is selected from the set of available LEP methods is selected based on at least one link parameter.

16. The method of claim 15 further comprising receiving a different LEP method based on a change in the at least one link parameter, wherein the different LEP method is selected from the set of available LEP methods.

17. The method of claim 13 further comprising sending one or more calibration parameters to the wireless multi-carrier access point depending on which LEP method of the set of available LEP methods is selected.

18. The method of claim 17, wherein the calibration parameters are based on at least one of a modulation technique, a Forward Error Correction (FEC) coding scheme and an antenna technique.

19. The method of claim 13 further comprising sending at least one of a capability and a preference of LEP methods to the wireless multi-carrier access point.

20. The method of claim 13 further comprising computing a channel quality metric.

21. The method of claim 20 further comprising sending the channel quality metric to the wireless multi-carrier access point.

22. The method of claim 13 further comprising sending a channel-quality metric time validity.

23. A wireless multi-carrier access point, the wireless multi-carrier access point comprising:
a receiver, the receiver capable of receiving a set of available link error prediction (LEP) methods from a wireless multi-carrier communication device, wherein an LEP method is a method used to determine an expected link performance metric based on at least one channel quality metric;
a processor, the processor capable of selecting an LEP method from the set of available LEP methods; and
a transmitter, the transmitter capable of communicating the selected LEP method to the wireless multi-carrier communication device.

24. The wireless multi-carrier access point of claim 23, wherein the LEP method is selected from the set of available LEP methods based on at least one link parameter, and the at least one link parameter is a parameter selected from a group comprising a modulation technique, a coding rate, a coding type, a quality of service (QoS), a coherence time, a user speed, a Doppler frequency, a bandwidth, a carrier frequency and an antenna technique.

25. The wireless multi-carrier access point of claim 23, wherein the receiver further receives at least one of a capability and a preference of LEP method from the wireless multi-carrier communication device.

26. The wireless multi-carrier access point of claim 23, wherein the receiver further receives a channel-quality metric time validity.

27. A wireless multi-carrier communication device, the wireless multi-carrier communication device comprising:
a transmitter, the transmitter capable of sending a set of available link error prediction (LEP) methods to a wireless multi-carrier access point, wherein an LEP method is a method used to determine an expected link performance metric based on at least one channel quality metric;

a receiver, the receiver capable of receiving an LEP method selected from the set of available LEP methods; and a processor, the processor capable of using the LEP method selected at the wireless multi-carrier access point during transmission of data between the wireless multi-carrier communication device and the multi-carrier access point.

28. The wireless multi-carrier communication device of claim 27 further comprising a computing module, the computing module capable of computing a channel quality metric.

29. The wireless multi-carrier communication device of claim 27, wherein the transmitter is further capable of transmitting a channel-quality metric to the wireless multi-carrier access point at predefined time intervals.

* * * * *